United States Patent
Leve

(10) Patent No.: US 9,724,985 B2
(45) Date of Patent: Aug. 8, 2017

(54) COVER FLAP ARRANGEMENT FOR A HANDLE ARRANGEMENT OF A MOTOR VEHICLE DOOR

(71) Applicant: Brose Schliesssysteme GmbH & Co. KG, Wuppertal (DE)

(72) Inventor: Dirk Leve, Neuss (DE)

(73) Assignee: Brose Schilesssysteme GmbH & Co. KG, Wuppertal (DE)

( * ) Notice: Subject to any disclaimer, the term of this patent is extended or adjusted under 35 U.S.C. 154(b) by 241 days.

(21) Appl. No.: 14/481,682

(22) Filed: Sep. 9, 2014

(65) Prior Publication Data
US 2015/0069768 A1    Mar. 12, 2015

(30) Foreign Application Priority Data

Sep. 10, 2013 (DE) .......................... 10 2013 109 914

(51) Int. Cl.
| | |
|---|---|
| *E05B 3/00* | (2006.01) |
| *B60J 5/04* | (2006.01) |
| *E05B 5/00* | (2006.01) |
| *E05B 85/10* | (2014.01) |

(52) U.S. Cl.
CPC .............. *B60J 5/0493* (2013.01); *E05B 5/00* (2013.01); *E05B 81/77* (2013.01); *E05B 85/103* (2013.01); *Y10T 292/57* (2015.04)

(58) Field of Classification Search
USPC ..................................................... 292/336.3
See application file for complete search history.

(56) References Cited

U.S. PATENT DOCUMENTS

| | | | | |
|---|---|---|---|---|
| 5,560,659 | A | * | 10/1996 | Dault ................... E05B 13/005 |
| | | | | 292/336.3 |
| 6,062,614 | A | * | 5/2000 | Petzold ................... E05B 85/14 |
| | | | | 292/336.3 |

(Continued)

FOREIGN PATENT DOCUMENTS

| | | |
|---|---|---|
| DE | 4217139 | 11/1993 |
| DE | 10219634 | 11/2003 |

(Continued)

OTHER PUBLICATIONS

"Search Report," for German Patent Application No. 102013109914.9 (with machine translation) filed Sep. 10, 2013 (9 pages).

(Continued)

*Primary Examiner* — Mark Williams
(74) *Attorney, Agent, or Firm* — Pauly, Devries Smith & Deffner, LLC

(57) ABSTRACT

The invention relates to a cover flap arrangement for a handle arrangement of a motor vehicle door, the handle arrangement having an, in particular, elongate handle section with a gripping region and two gripping openings which are arranged on both sides of the handle section towards the gripping region. It is proposed that the cover flap arrangement has two cover flaps which can be adjusted in each case between a covering position, in which, in the installed state, they in each case cover a gripping opening, in particular sealingly, and an exposing position, in which, in the installed state, they in each case expose a gripping opening.

19 Claims, 3 Drawing Sheets

(56) References Cited

U.S. PATENT DOCUMENTS

| | | | | |
|---|---|---|---|---|
| 7,108,303 | B2* | 9/2006 | Bladow | B21D 53/88 |
| | | | | 293/102 |
| 7,237,411 | B2* | 7/2007 | Pantke | E05B 77/02 |
| | | | | 16/412 |
| 2010/0133858 | A1* | 6/2010 | Huck | B60R 5/04 |
| | | | | 292/336.3 |
| 2014/0300115 | A1* | 10/2014 | Vasi | E05B 85/103 |
| | | | | 292/336.3 |
| 2015/0315812 | A1* | 11/2015 | Vasi | E05B 5/006 |
| | | | | 292/336.3 |
| 2016/0138307 | A1* | 5/2016 | Pohl | E05B 81/76 |
| | | | | 292/336.3 |

FOREIGN PATENT DOCUMENTS

| | | |
|---|---|---|
| DE | 102004015136 | 9/2005 |
| DE | 102006027473 | 12/2007 |
| DE | 102005003932 | 9/2009 |
| EP | 0183880 | 6/1986 |
| WO | 2015011218 | 1/2015 |

OTHER PUBLICATIONS

European Search Report for European Patent Application No. 14184225, related to co-pending U.S. Appl. No. 14/481,682 mailed Feb. 5, 2016 (5 pages).

\* cited by examiner

COVER FLAP ARRANGEMENT FOR A HANDLE ARRANGEMENT OF A MOTOR VEHICLE DOOR

CROSS-REFERENCE TO RELATED APPLICATIONS

This application claims benefit of German Patent Application Serial No. DE 10 2013 109 914.9, filed Sep. 10, 2013 entitled "Abdeckklappenanordnung für eine Handgriffanordnung einer Kraftfahrzeugtür," the disclosure of which is hereby incorporated by reference herein in its entirety.

FIELD OF THE INVENTION

The invention relates to a cover flap arrangement for a handle arrangement of a motor vehicle door, to a handle arrangement of a motor vehicle door, to a motor vehicle door, and to a method for operating a motor vehicle door.

BACKGROUND

In the past, the design freedom for the external design of motor vehicles was restricted considerably by the necessity of mechanically complicated handle arrangements for motor vehicle doors.

The term "motor vehicle door" is to be interpreted broadly in the present case. It includes, for example, side doors, rear hatches, rear lids, engine bonnets, load compartment floors or the like.

An increase in the above design freedom can be achieved, for example, by virtue of the fact that the handle arrangement is covered by a cover flap arrangement as long as no actuation of the handle arrangement is imminent. The known cover flap arrangement (DE 10 2005 003 932 B4), from which the invention proceeds, discloses a cover flap which can be displaced by motor and can be displaced into a covering position which covers the handle arrangement. The handle arrangement has a hoop-like handle section, the cover flap which is situated in the exposing position permitting gripping from both sides of the handle section, that is to say from the top and from the bottom. However, the sliding movement of the cover flap leads to gripping being possible successively first on one side and then on the other side of the handle section. In order to avoid possible waiting times for the user, the sliding movement of the cover flap is to be carried out at a particularly high speed, which leads to high structural outlay. Furthermore, it is noteworthy that the sliding movement which is provided over the entire width of the handle section requires a complicated linear guide, which further increases the structural outlay.

The invention is based on the problem of configuring and developing the known cover flap arrangement in such a way that high user comfort can be realized with low structural outlay.

SUMMARY

The above problem is solved in a cover flap arrangement for a handle arrangement of a motor vehicle door.

First of all, the finding is essential that flexible and at the same time comfortable actuation of the handle arrangement can be achieved by way of a handle section and gripping openings which are arranged on both sides of the handle section towards a gripping region. Correspondingly, it is proposed in the context of a targeted design that the cover flap arrangement has two cover flaps which are assigned in each case to a gripping opening. In the installed state, the cover flaps can be adjusted in each case between a covering position, in which they in each case cover a gripping opening, and an exposing position, in which they in each case expose a gripping opening.

The fact that a realization is possible with particularly low structural outlay is first of all interesting in the solution according to the proposal. Cover flaps of this type can be implemented easily as pivotable flaps. Furthermore, it is interesting that both cover flaps can be adjusted readily at the same time into the exposing position. In the case of a corresponding design, this results in immediate availability of both gripping sides of the handle section.

The solution according to the proposal is also advantageous with regard to the resulting design freedom. In the case of a suitable design, the gripping openings are not very disruptive even in the covering position, since they can be reduced to the absolutely necessary dimension. The fact that the shape of the gripping openings can itself represent a design feature is particularly interesting here.

In an embodiment, in the covering position, the cover flaps are arranged in each case in a substantially planar manner with an outer wall surface, in particular with an outer wall surface of a motor vehicle door. In this embodiment, the cover flaps are barely noticeable as long as they are in the covering position.

In some embodiments, the gripping region is delimited by a recessed grip, the recessed grip having articulation openings in one variant, through which articulation openings the cover flaps are articulated. In some embodiments, in the exposing position, the cover flaps cover the articulation openings in the recessed grip, which is advantageous, in particular, in the sense of protection against misuse.

In an embodiment, the two cover flaps are movement-coupled to one another. The term "movement-coupled" is to be understood broadly in the present case. It comprises both a mechanical movement coupling and a movement coupling in terms of control technology. As a result, it means that both cover flaps are always adjusted at the same time.

In an embodiment, a drive arrangement is provided for the motorized adjustment of the cover flaps, an advancing mechanism which is configured as a rack and pinion gear mechanism being used in one variant.

A handle arrangement of a motor vehicle door is described herein. The realization of a cover flap arrangement according to the proposal is essential according to this further teaching, with the result that reference may be made to this extent to the comments made with respect to the cover flap arrangement according to the proposal.

In an embodiment, a motor vehicle door of a motor vehicle having a supporting structure and an exterior door skin which is arranged on the supporting structure, and having a handle arrangement as described herein. Once again, reference may be made to all comments with respect to the cover flap arrangement according to the proposal.

A method for operating a cover flap arrangement is described herein.

According to this further teaching, it is essential that the occurrence of a predefined user action is monitored by means of a control device, and that, if the user action is detected, possibly after testing of further conditions, such as an authentication of the user, the cover flaps of the cover flap arrangement are adjusted in a motorized manner into their respective exposing position by means of a drive arrangement.

According to the proposal, it is therefore the case that a predefined user action, which can be, for example, the approach of the hand of a user to the cover flap arrangement, triggers an adjustment of the cover flaps into their respective exposing positions. The virtually immediate availability of both gripping sides of the gripping section can be achieved by way of the method according to the proposal by virtue of the fact that the adjustment of the cover flaps of a cover flap arrangement according to the proposal can take place at the same time in a particularly simple way.

In an embodiment the invention provides a cover flap arrangement for a handle arrangement of a motor vehicle door, the handle arrangement having an elongate handle section with a gripping region and two gripping openings which are arranged on both sides of the handle section towards the gripping region, and the cover flap arrangement having two cover flaps which can be adjusted in each case between a covering position, in which, in the installed state, they in each case cover a gripping opening, such as sealingly, and an exposing position, in which, in the installed state, they in each case expose a gripping opening.

In an embodiment, in the covering position, the cover flaps are arranged, in the installed state, in each case in a substantially planar manner with an outer wall surface.

In an embodiment, the two cover flaps dip, such as pivot, into the gripping region during the adjustment from the respective covering position into the respective exposing position.

In an embodiment, the adjusting movements of the cover flaps have a rotational component and/or a linear component.

In an embodiment, the cover flaps are in each case assigned a pivot axis, and in that the cover flaps can be adjusted in a correspondingly pivoting manner, such as in that the pivot axes are arranged so as to lie opposite in relation to the handle section, and such as in that the pivot axes of the cover flaps are arranged in each case on an edge region of the respective gripping opening, which edge region faces away from the handle section.

In an embodiment, the gripping region is delimited by a recessed grip, such as the recessed grip has articulation openings, through which the cover flaps are articulated.

In an embodiment, in the exposing position, the cover flaps in each case cover an articulation opening in the recessed grip, such as sealingly.

In an embodiment, in the exposing position, the cover flaps are arranged in each case in a substantially planar manner with a wall surface of the recessed grip.

In an embodiment, the two cover flaps are movement-coupled to one another, such as the two cover flaps are movement-coupled to one another in such a way that they in each case reach their covering positions and/or their exposing positions at the same time, and possibly in that the pivoting directions of the two cover flaps are always opposed to one another.

In an embodiment, the adjusting travels of the two cover flaps between the respective covering position and the respective exposing position differ from one another in terms of magnitude, and/or in that the cover flaps have different flap geometries, such as different flap surfaces.

In an embodiment, a drive arrangement is provided for the motorized adjustment of the cover flaps, such as the drive arrangement has a drive motor and an advancing mechanism which is connected downstream of the drive motor, such as the advancing mechanism is configured as a rack and pinion gear mechanism, and possibly in that the advancing mechanism has two drive racks which in each case act eccentrically on the pivot axes of the cover flaps in order to transmit the drive movements.

In an embodiment, a support is provided for accommodating at least part of the components of the cover flap arrangement, such as the support provides a constituent part of the handle section, which constituent part absorbs the actuating force, and/or in that the support provides the recessed grip which delimits the gripping region.

In an embodiment the invention provides a handle arrangement of a motor vehicle door, a handle section with a gripping region and two gripping openings which are arranged on both sides of the handle section towards the gripping region, and a cover flap arrangement for covering the gripping openings as described herein.

In an embodiment the invention provides a motor vehicle door having a supporting structure and having an exterior door skin which is arranged on the supporting structure, and having a handle arrangement as described herein.

In an embodiment, the exterior door skin and/or the supporting structure provide/provides a constituent part of the handle section, which constituent part absorbs the actuating force.

In an embodiment, the cover flaps are arranged above and below the handle section in relation to the vertical axis of the motor vehicle.

In an embodiment the invention provides a method for operating a cover flap arrangement as described herein, wherein the occurrence of a predefined user action, in particular the approach of the hand of the user to the cover flap arrangement, is monitored by means of a sensor device, and in that, if the user action is detected, possibly after testing of further conditions, such as an authentication of the user, the cover flaps of the cover flap arrangement are adjusted in a motorized manner into their respective exposing position, in particular at the same time, by means of a drive arrangement.

BRIEF DESCRIPTION OF THE FIGURES

In the following text, the invention will be explained in greater detail using a drawing which shows merely one exemplary embodiment and in which.

DETAILED DESCRIPTION

Figure 1:
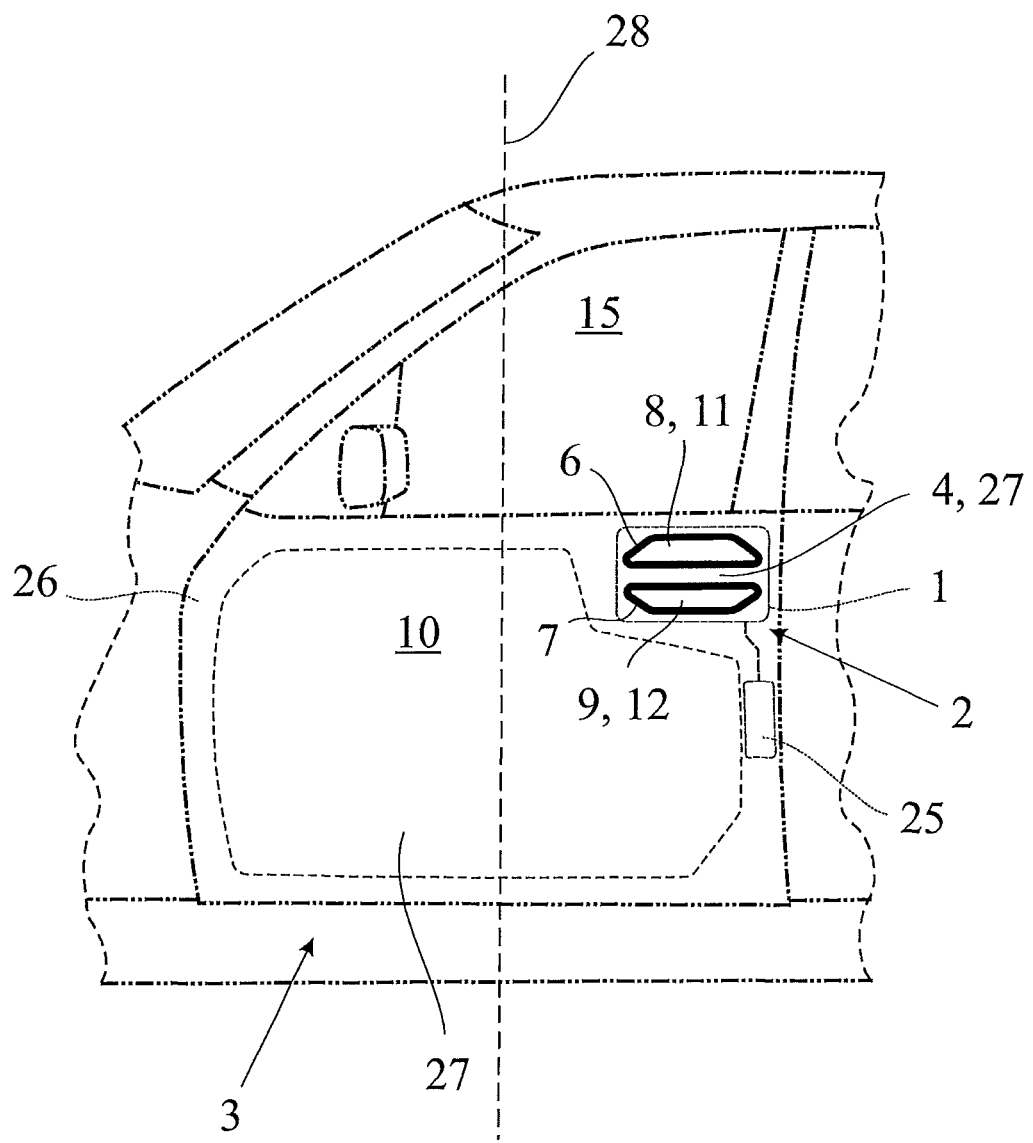
FIG. 1 shows a motor vehicle door according to the proposal of a motor vehicle having a handle arrangement according to the proposal and a cover flap arrangement according to the proposal.

The cover flap arrangement 1 according to the proposal is assigned to a handle arrangement 2 of a motor vehicle door 3. With regard to the broad interpretation of the term "motor vehicle door," reference may be made to the introductory part of the description.

The handle arrangement 2 has a handle section 4 which can be elongate here with the gripping region 5 and two gripping openings 6, 7 which are arranged on both sides of the handle section 4 towards the gripping region 5.

The gripping openings 6, 7 which are arranged on both sides of the handle section 4 result in the possibility for the user to actuate the handle section 4 from two gripping sides of the handle section 4.

The cover flap arrangement 1 has two cover flaps 8, 9 which can be adjusted in each case between a covering position (FIGS. 2a, 3a) and an exposing position (FIGS. 2b, 3b). In the installed state, the cover flaps 8, 9 which are situated in the covering position in each case cover a gripping opening 6, 7. In an embodiment which is not shown here, the cover is a sealing cover. The edge of the respective gripping opening 6, 7 can then be equipped with a corresponding seal, in particular a sealing lip. In principle, however, it can also be provided that the cover flaps 8, 9 lie in an overlapping manner on edge regions of the gripping openings 6, 7 in the covering position.

In the installed state, the cover flaps 8, 9 which are situated in the exposing position in each case expose a gripping opening 6, 7, with the result that the user can selectively reach with his/her hand into one of the gripping openings 6, 7, can dip into the gripping region 5 and in the process can actuate the handle section 4.

In the exemplary embodiment which is shown, particularly high design freedom in the above sense results by virtue of the fact that, in the installed state, the cover flaps 8, 9 are arranged in the covering position (FIGS. 2a, 3a) in each case in a substantially planar manner with an outer wall surface 10. In the case of a suitable design, the handle arrangement 2 is then scarcely visible.

A combination of FIGS. 2a and 2b shows that the two cover flaps 8, 9 dip, in this case pivot, into the gripping region 5 during the adjustment from the respective covering position into the respective exposing position. The direction of the movement of the covering flaps 8, 9 into the respective exposing position corresponds substantially to the gripping direction of the hand of the user. The risk of the hand of the user being pinched during reaching into the gripping region 5 can be largely reduced by virtue of the fact that the cover flaps 8, 9 and the hand of the user move substantially in the same direction.

In principle, the adjusting movements of the cover flaps 8, 9 can have a rotational component and/or a linear component. However, it is the case here that the two cover flaps 8, 9 perform exclusively rotational adjusting movements, in particular pivoting movements.

Correspondingly, it is further the case that the cover flaps 8, 9 are in each case assigned a pivot axis 8a, 9a, and that the cover flaps 8, 9 can be adjusted in a pivoting manner correspondingly.

The fact that the pivot axes 8a, 9a are arranged so as to lie opposite in relation to the handle section 4 is interesting in the exemplary embodiment which is shown. The pivot axes 8a, 9a of the cover flaps 8, 9 can be arranged in each case on an edge region of the respective gripping opening 6, 7, which edge region faces away from the handle section 4.

In an embodiment, the pivot axes 8a, 9a of the cover flaps 8, 9 are configured substantially parallel to one another, with the result that the adjusting movements of the cover flaps 8, 9 are largely symmetrical. As a result, an adjustment of the cover flaps 8, 9 into the respective exposing position occurs with an elegant overall impression, in so far as the adjustment takes place at the same time. The adjustment of the cover flaps 8, 9 at the same time will be explained in detail further below.

Here, the cover flaps 8, 9 have a structurally particularly simple construction. In order to cover the respective gripping opening 6, 7, the cover flaps 8, 9 are equipped with a plate-like flap element 11, 12, the outer contour of which corresponds substantially to the inner contour of the respective gripping opening 6, 7. In order to articulate the cover flaps 8, 9 on the respective pivot axes 8a, 9a, the flap elements 11, 12 are fastened in each case to a link 13, 14. The links 13, 14 are in turn articulated on the pivot axes 8a, 9a.

The flap elements 11, 12 can be fastened in a positively locking manner, in particular clipped, to the above links 13, 14, with the result that simple replacement of the flap elements 11, 12 is possible in the case of repairs.

The gripping region 5 is delimited towards the motor vehicle interior 15 or towards the door interior by way of a recessed grip 16. In principle, it can be provided that the cover flaps 8, 9 are always arranged with their links 13, 14 within the gripping region 5. However, it is the case here that the recessed grip 16 has articulation openings 17, 18, through which the cover flaps 8, 9 are articulated with the links 13, 14 here.

FIG. 3b shows that, in the exposing position, the cover flaps 8, 9 in each case cover an articulation opening 17, 18 in the recessed grip 16. Here, this can be a sealing cover. This is realized by virtue of the fact that, in the exposing position, the cover flaps 8, 9 lie in an overlapping manner on the edge regions of the articulation openings 17, 18.

Furthermore, it can be gathered from the illustration according to FIG. 3b that, in the exposing position, the cover flaps 8, 9 are in each case arranged in a substantially planar manner with a wall surface of the recessed grip 16. This is advantageous not only for the design impression, but rather also in order to avoid misuse by reaching into the articulation openings 17, 18.

As viewed in a sectional plane which is oriented perpendicularly at least with respect to one of the pivot axes 8a, 9a of the cover flaps 8, 9, the wall section which has the articulation openings 17, 18 and is formed by the recessed grip 16 runs convexly in relation to the vehicle interior 15, whereas the wall section which has the gripping openings 6, 7 runs concavely in relation to the vehicle interior 15. The pivot axes 8a, 9a of the cover flaps 8, 9 are interestingly arranged in a plane which runs through the gripping region 5. As a result, it is possible that both the gripping openings 6, 7 and the articulation openings 17, 18 can be reached by way of simple pivoting movements by the cover flaps 8, 9.

It is of particular significance for the operating comfort in the present case that the two cover flaps 8, 9 are movement-coupled to one another. It has already been noted that this can be a mechanical movement coupling, or also an electronic movement coupling.

In an embodiment, the two cover flaps 8, 9 are movement-coupled to one another in such a way that they in each case reach their covering positions and/or their exposing positions at the same time. In an embodiment, the pivoting directions of the two cover flaps 8, 9 are always opposed to one another. This can be gathered best from the illustration according to FIG. 3. An adjustment of the cover flaps 8, 9 from the covering position (FIG. 3a) into the exposing position (FIG. 3b) is associated in the case of the cover flap 8 with pivoting counter to the clockwise direction and in the case of the cover flap 9 with pivoting in the clockwise direction.

In order to further increase the design freedom in the exterior design of the motor vehicle, it is further provided that the adjusting travels of the two cover flaps 8, 9 between the respective covering position and the respective exposing position can differ from one another in terms of magnitude. As an alternative or in addition, it can be provided that the cover flaps 8, 9 have different flap geometries, in particular different flap surfaces of the flap elements 11, 12.

Figure 2:
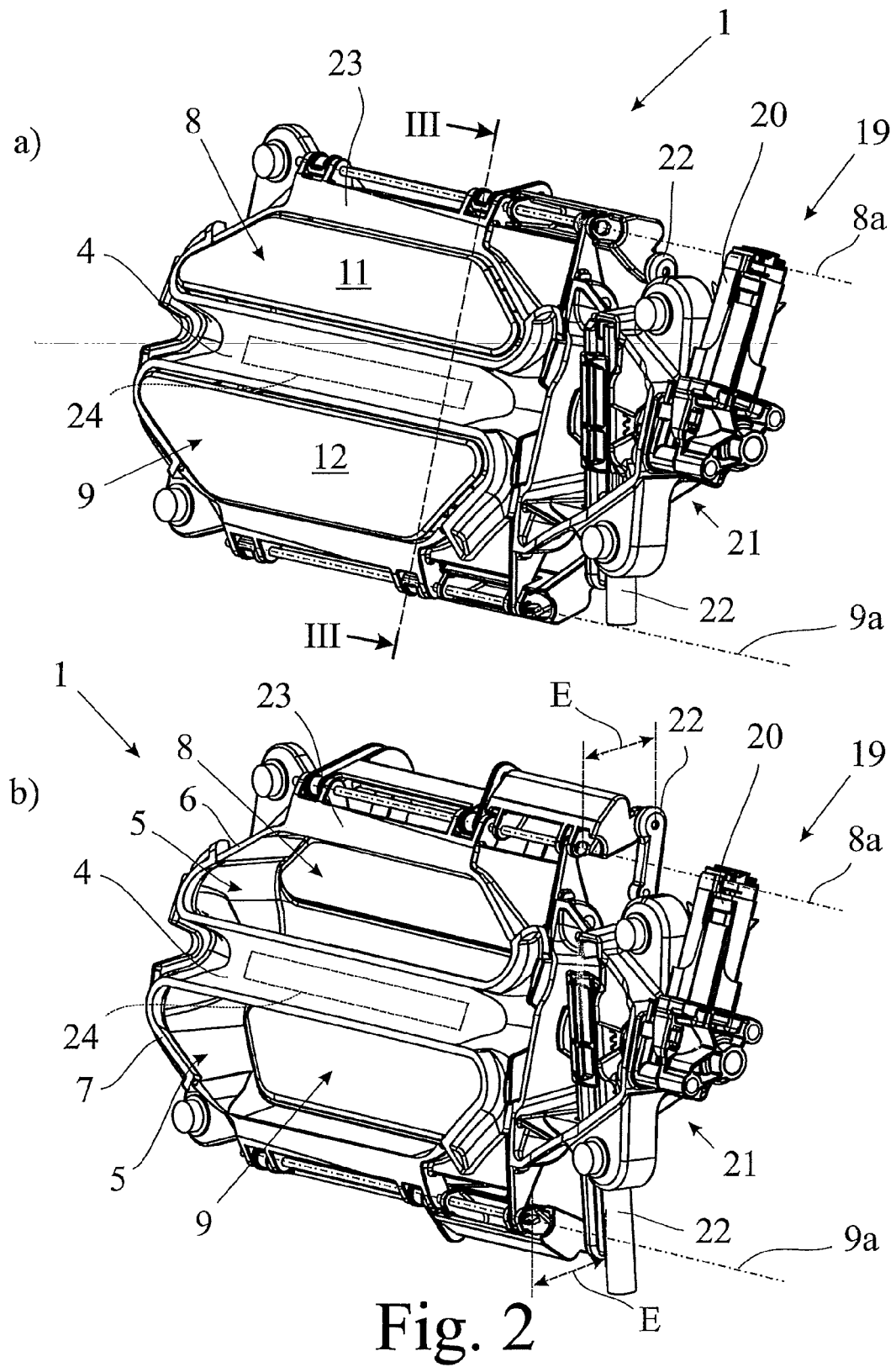
FIG. 2 shows the cover flap arrangement according to FIG. 1 in the dismantled state a) in the case of cover flaps which are situated in the covering position and b) in the case of cover flaps which are situated in the exposing position.

In the sense of particularly comfortable actuation, the cover flap arrangement 1 which is shown is equipped with a drive arrangement 19 for the motorized adjustment of the cover flaps 8, 9. FIG. 2 shows that the drive arrangement 19 has a drive motor 20 and an advancing mechanism 21 which is connected downstream of the drive motor 20 in order to generate drive movements here. In the construction which is shown in FIG. 2, a particularly robust embodiment results from the fact that the advancing mechanism 21 is configured as a rack and pinion gear mechanism, and possibly that the advancing mechanism 21 has two drive racks 22 which act in each case eccentrically on the pivot axes 8a, 9a of the cover flaps 8, 9 in order to transmit the drive movements. The eccentricity of the articulation is indicated in FIG. 2 by way of the reference sign "E". In principle, other types of drive arrangements are conceivable for the cover flap arrangement 1 according to the proposal. For example, the advancing mechanism 21 can be configured as a spur gear mechanism, as a cable mechanism or the like.

Figure 3:
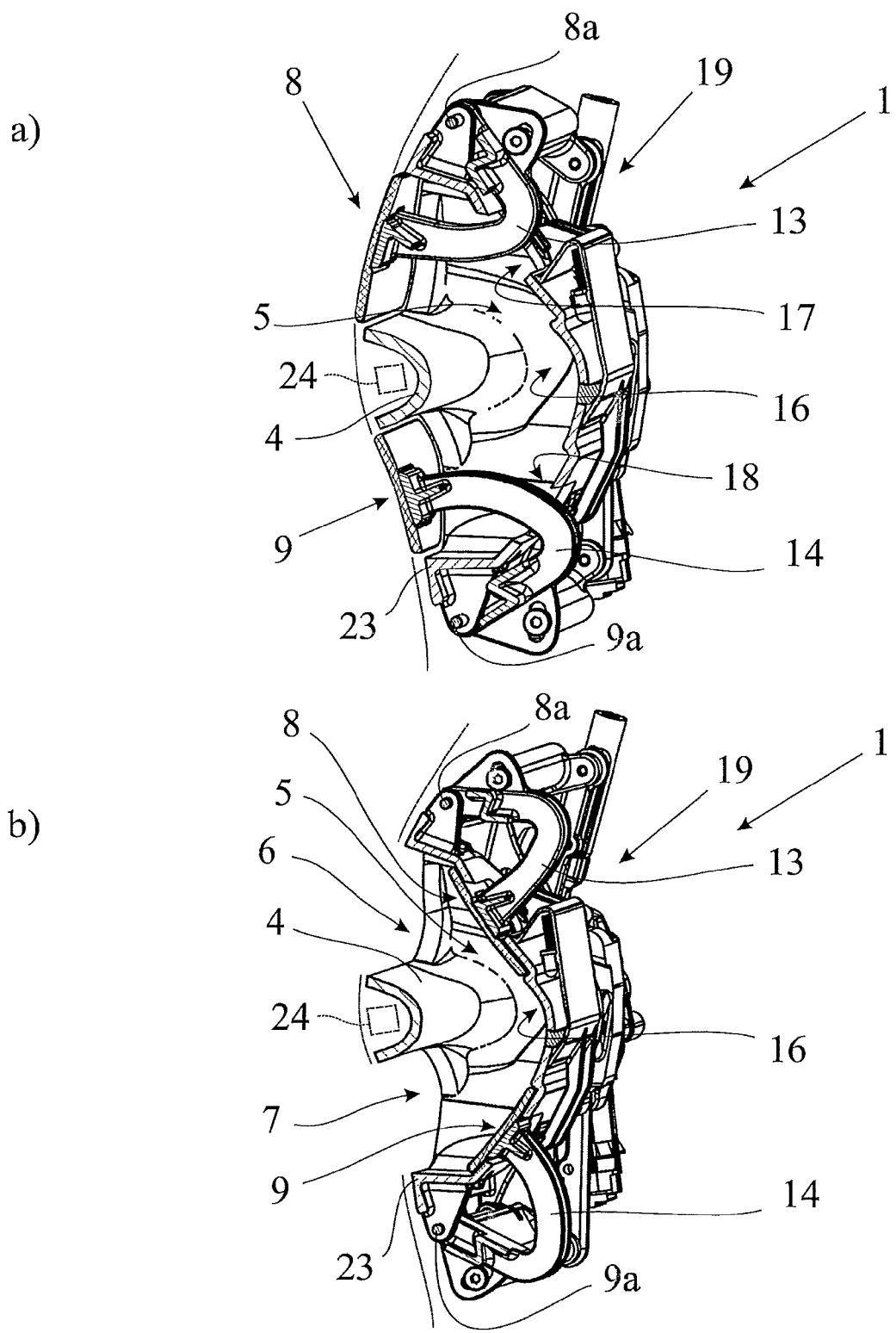
FIG. 3 shows the cover flap arrangement according to FIG. 2 in a sectional illustration along the sectional line III-III a) in the case of cover flaps which are situated in the covering position and b) in the case of cover flaps which are situated in the exposing position.

The cover flap arrangement 1 which is shown is of modular construction to the extent that it can be attached as a functional unit from the inside to a motor vehicle door 3. For this purpose, it is advantageous that a support 23 is provided for accommodating at least part of the components of the cover flap arrangement 1. Here, the support 23 accommodates the cover flaps 8, 9 and the entire drive arrangement 19. Furthermore, it is the case here that the support 23 provides a constituent part of the handle section 4, which constituent part absorbs the respective actuating force. FIG. 3 shows that the handle section 4 is of correspondingly robust design, with the result that the motor vehicle door 3 can be moved via gripping by way of the handle section 4.

The cover flap arrangement 1 can be equipped with a sensor arrangement 24 for detecting a predefined user action, such as the approach of the hand of a user to the motor vehicle door 3. In FIGS. 2 and 3, a sensor arrangement 24 of this type is accommodated in the handle section 4. If a user action is detected, possibly after testing of further conditions, such as an authentication of the user, an actuation of the drive arrangement 19 can be provided for the adjustment of the cover flaps 8, 9 into the exposing position. Furthermore, it can be advantageous that the sensor arrangement 24 or a further sensor arrangement detects whether reaching of the hand of the user into the gripping region 5 with subsequent actuation of the handle section 4 takes place, which can be accompanied by the opening of the motor vehicle door 3. The opening of the motor vehicle door 3 can take place by way of the actuation of a motor vehicle lock 25 which is merely indicated in FIG. 1.

In the exemplary embodiment which is shown, the handle section 4 is of immovable configuration. Here, an actuation of the motor vehicle lock 25 in order to open the motor vehicle door takes place using sensors. In principle, however, it can also be advantageous that the handle section 4 is of movable configuration or has a movable component, in order to mechanically or electrically trigger the opening of the motor vehicle door 3 via the motor vehicle lock 25.

The handle arrangement 2 according to the proposal has, as addressed above, a handle section 4 with a gripping section 5 and two gripping openings 6, 7 which are arranged on both sides of the handle section 4 towards the gripping region 5. Furthermore, the handle arrangement 2 according to the proposal is equipped with a cover flap arrangement 1 according to the proposal for covering the gripping openings 6, 7. To this extent, reference may be made to all the comments with respect to the cover flap arrangement 1 according to the proposal.

According to a further teaching which is likewise given independent significance, the motor vehicle door 3 having a supporting structure 26 and an exterior door skin 27 which is arranged on the supporting structure 26, and having a handle arrangement 2 according to the proposal is described herein. Reference may be made to all comments with respect to the handle arrangement 2 according to the proposal and the cover flap arrangement 1 according to the proposal.

It is the case in some embodiments that the exterior door skin 27 and/or the supporting structure 26 provide/provides a constituent part of the handle section 4, which constituent part absorbs the actuating force, that is to say the force which acts on the motor vehicle door 3 by way of the hand of the user. It is also conceivable, however, that the exterior door skin 27 and/or the supporting structure 26 provide/provides merely the two gripping openings 6, 7, to which the cover flap arrangement 1 according to the proposal is attached from the door interior.

In some embodiments, the motor vehicle door 3 according to the proposal has that the cover flaps 8, 9 are arranged above and below the handle section 4 in relation to the vertical axis 28 of the motor vehicle. This permits the user to reach into the gripping region 5 from a region above the handle section 4 and a region below the handle section 4, which overall leads to high use flexibility and, as a result, to high use comfort.

According to a further teaching which is likewise given independent significance, a method for operating a cover flap arrangement 1 according to the proposal is described herein. It is essential that the occurrence of a predefined user action which is addressed above is monitored by means of a sensor device. A predefined user action of this type can be, for example, the approach of the hand of the user to the cover flap arrangement 1. If the user action is detected, the cover flaps 8, 9 of the cover flap arrangement 1 are adjusted in a motorized manner into their respective exposing position by means of an above drive arrangement 19, possibly after testing of further conditions, such as an authentication of the user. The high use flexibility addressed above is produced in the case of the two cover flaps 8, 9 being adjusted at the same time. The return of the cover flaps 8, 9 into the covering position can take place after a predefined delay time has passed. A different rule for the return of the cover flaps 8, 9 is conceivable.

The invention claimed is:

1. A cover flap arrangement for a handle arrangement of a motor vehicle door, the cover flap arrangement comprising two cover flaps;
   wherein the handle arrangement has an elongate handle section and two gripping openings, the elongate handle section having a gripping region and the two gripping openings arranged on opposite sides of the handle section and extending toward the gripping region;
   wherein in an installed state of the cover flap arrangement, each cover flap is adjustable between a covering position and an exposing position;
   wherein in the covering position each cover flap covers a respective gripping opening; and
   wherein in the exposing position, each cover flap exposes the respective gripping opening.

2. The cover flap arrangement according to claim 1, wherein in the covering position, the cover flaps are arranged in a substantially planar manner with an outer wall surface.

3. The cover flap arrangement according to claim 1, wherein the two cover flaps dip into the gripping region during the adjustment from the respective covering position into the respective exposing position.

4. The cover flap arrangement according claim 1, wherein an adjusting movement of the cover flaps between the covering position and the exposing position comprises a rotational component and/or a linear component.

5. The cover flap arrangement according to claim 1, wherein each of the cover flaps comprises a pivot axis, and wherein each of the cover flaps can be adjusted in a pivoting manner.

6. The cover flap arrangement according claim 1, wherein the gripping region is delimited by a recessed grip.

7. The cover flap arrangement according to claim 6, wherein in the exposing position, each of the cover flaps covers an articulation opening in the recessed grip.

8. The cover flap arrangement according to claim 6, wherein in the exposing position, each of the cover flaps is arranged in a substantially planar manner with a wall surface of the recessed grip.

9. The cover flap arrangement according to claim 1, wherein the two cover flaps are movement-coupled to one another.

10. The cover flap arrangement according to claim 1, wherein adjusting movements of the two cover flaps between the respective covering position and the respective exposing position differ from one another in terms of magnitude, and/or wherein the cover flaps have different flap geometries.

11. The cover flap arrangement according to claim 1, further comprising a drive arrangement for the motorized adjustment of the cover flaps.

12. The cover flap arrangement according to claim 1, wherein a support is provided for accommodating at least part of the components of the cover flap arrangement.

13. A handle arrangement of a motor vehicle door comprising: a handle section with a gripping region and two gripping openings which are arranged on both sides of the handle section towards the gripping region, and a cover flap arrangement for covering the gripping openings according to claim 1.

14. A motor vehicle door comprising a supporting structure; an exterior door skin which is arranged on the supporting structure, and a handle arrangement according to claim 13.

15. The motor vehicle door according to claim 14, wherein the exterior door skin and/or the supporting structure provide/provides a constituent part of the handle section, wherein the constituent part absorbs an actuating force.

16. The motor vehicle door according to claim 14, wherein the cover flaps are arranged above and below the handle section in relation to the vertical axis of the motor vehicle.

17. The cover flap arrangement according claim 6, wherein the recessed grip defines articulation openings, through which the cover flaps are articulated.

18. The cover flap arrangement according to claim 9, wherein the two cover flaps are movement-coupled to one another in such a way that the two cover flaps each reach their covering positions and/or their exposing positions at the same time.

19. The cover flap arrangement according to claim 18, wherein the pivoting directions of the two cover flaps are always opposed to one another.

\* \* \* \* \*